United States Patent Office 3,321,383
Patented May 23, 1967

3,321,383
PROCESS FOR ELIMINATING FLUORINATED HALOGEN BUTENES FROM 2,2,2-TRIFLUO-RO-1-CHLORO-1-BROMO-ETHANE
Otto Scherer, Bad Soden, Taunus, and Heinrich Kühn, Frankfurt am Main, Germany, assignors to Farbwerke Hoechst Aktiengesellschaft vormals Meister Lucius & Bruning, Frankfurt am Main, Germany, a corporation of Germany
No Drawing. Filed Nov. 2, 1964, Ser. No. 408,387
Claims priority, application Germany, Nov. 7, 1963, F 41,210
9 Claims. (Cl. 203—37)

2,2,2-trifluoro-1-chloro-1-bromo-ethane has achieved considerable importance as an inhalation anesthetic. Depending on the method of preparation applied 2,2,2-trifluoro-1-chloro-1-brome-ethane may be contaminated with small amounts of fluorinated halogen butenes, especially 1,1,1,4,4,4 - hexafluoro - 2,3-dichlorobutene - 2, 1,1,1,4,4,4-hexafluoro-monochloro-butene-2 and 1,1,1,-4,4,4-hexafluoro-monobromo-butene-2. Due to their toxicity these impurities may unfavorably affect the patient's organism.

The present invention relates to a process for eliminating these fluorinated halogen butenes from 2,2,2-trifluoro-1-chloro-1-bromo-ethane. More particularly, the process consists in reacting a mixture of said substances with an alcoholic solution of an alkali metal hydroxide or alcoholate and subsequently isolating the pure trifluoro-chloro-bromo-ethane.

As a rule, the process of the invention is applicable independently of the concentration ratio of the reactants to be separated. However, its main field of application is regarded to be the elimination of small amounts of the impurities mentioned above from a mixture consisting mainly of 2,2,2-trifluoro-1-chloro-1-bromo-ethane. It is immaterial for the success of the process whether the impurities mentioned are contained in the mixture together singly or in combination.

As an alcoholic solution of an alkali metal hydroxide or alcoholate there may be used, for example, a solution of an alkali metal hydroxide or alcoholate, especially of sodium or potassium hydroxide, sodium or potassium methylate, ethylate or propylate in an alcohol miscible with water in any ratio desired, preferably in a lower aliphatic alcohol such as methanol, ethanol or propanol. The concentration ratio of the alkali metal hydroxide in the alcoholic solution is not critical to the success of the process of the invention. Solutions having a concentration of about 1 to 20% have proved particularly suitable for the purpose.

The alcoholic solution is added to the mixture to be separated in a quantity of at least two mols of alkali metal hydroxide or alkali metal alcoholate per mol of butene.

The halogenated hydrocarbons to be separated and the alcoholic alkali metal hydroxide solution can be mixed at any temperature desired. It is, of course, essential to choose a temperature at which both components are in the liquid state. For reasons of expediency, the process should be carried out at a temperature below the boiling point of 2,2,2-trifluoro-1-chloro-1-bromo-ethane, preferably at 0 to 25° C.

It is desirable to allow the mixture consisting of the halogenated hydrocarbons mentioned and the alcoholic alkali metal hydroxide or alcoholate solution to stand for some time. In the majority of cases the mixture turns turbid.

Subsequently, the mixture is subjected to an appropriate working-up process by which the trifluoro-chloro-bromo-ethane is isolated. Suitable separation processes are, for example, distillation—preferably in vacuo—or extraction. Extraction of the undesirable alkaline components with water and subsequent rectification of the remaining 2,2,2 - trifluoro - 1 - chloro - 1 - bromo - ethane has proved a particularly successful method of separation.

The 2,2,2-trifluoro-1-chloro-1-bromo-ethane obtained according to this method is free from fluorinated halogen butenes.

The following examples serve to illustrate the invention but they are not intended to limit it thereto, the parts and percentages being by weight unless otherwise stated.

Example 1

50 parts of 2,2,2-trifluoro-1-chloro-1-bromo-ethane containing an impurity of about 0.016% of 1,1,1,4,4,4-hexafluoro-2,3-dichloro-butene-2 which was detected by gas chromatographic analysis are mixed at room temperature with 50 parts of a 10% solution of potassium hydroxide in methanol. After having been allowed to stand for one hour, the reaction mixture is mixed with 100 cc. of water, which causes separation into an aqueous and a non aqueous layer. The aqueous layer is discarded, and the non aqueous layer, which consists substantially of 2,2,2-trifluoro-1-chloro-1-bromo-ethane, is washed twice with a small amount of water, dried with calcium chloride and distilled.

45 g. of 2,2,2-trifluoro-1-chloro-1-bromo-ethane are obtained, boiling at 49.7° C. at 746 mm. Hg and corresponding to 90% of the theoretical amount. No. 1,1,1-4,4,4-hexafluoro-2,3-dichloro-butene-2 can be detected by gas chromatography in the product obtained.

Example 2

100 parts of 2,2,2-trifluoro-1-chloro-1-bromo-ethane containing an impurity of about 0.028% of 1,1,1,4,4,4-hexafluoro-2,3-dichloro-butene-2 (determined by gas chromatography) are mixed at room temperature with 100 parts of a 20% solution of potassium hydroxide in methanol. After having been allowed to stand for 30 minutes, the reaction mixture is mixed with 200 cc. of water, which causes separation into an aqueous and a non aqueous layer. The aqueous layer is discarded, and the non aqueous layer consisting substantially of 2,2,2-trifluoro-1-chloro-1-bromo-ethane is washed once more with water, dried with calcium chloride and distilled. 92 parts of 2,2,2-trifluoro-chloro-bromo-ethane are obtained wherein no 1,1,1,4,4,4-hexafluoro-2,3-dichlorobutene-2 can be detected by gas chromatography.

Example 3

A solution of 2.5 parts of sodium hydroxide in 60 parts of n-butanol is mixed with 930 parts of 2,2,2-trifluoro-1-chloro-1-bromo-ethane containing 0.1% w./w. of 1,1,1,-4,4,4-hexafluoro-2,3-dichlorobutene-2 and 0.01% w./w. of 1,1,1,4,4,4-hexafluoro-2-bromobutene-2. The mixture is stirred overnight. 2,000 parts of water are then added with stirring. Separation of the non-aqueous phase gives 2,2,2-trifluoro-1-chloro-1-bromo-ethane which is shown by gas/liquid chromatographic analysis to contain approximately 0.002% w./w. of 1,1,1,4,4,4-hexafluoro-2,3-dichlorobutene-2 and less than 0.001% w./w. of 1,1,1,-4,4,4-hexafluoro-2-bromo-butene-2.

Example 4

To 93 parts of 2,2,2-trifluoro-1-chloro-1-bromo-ethane containing 0.006% w./w. of 1,1,1,4,4,4-hexafluoro-2-chloro-butene-2, 0.020% w./w. of 1,1,1,4,4,4-hexafluoro-2-bromo-butene-2 and 0.020% w./w. of 1,1,1,4,4,4-hexa-fluoro-2,3-dichloro-butene-2 is added a solution of 1 part of sodium hydroxide in 12 parts of n-butanol. The mixture is stirred for 4 hours and then treated with 200 parts of water, the non-aqueous phase, on separation, consists of 2,2,2-trifluoro-1-chloro-1-bromo-ethane containing less than 0.001% w./w. of each of the said butenes, as determined by gas/liquid chromatographic analysis.

We claim:
1. A process for the purification of 2,2,2-trifluoro-1-chloro-1-bromo-ethane contaminated with 1,1,1,4,4,4-hexafluoro-2,3-dichloro-butene-2, 1,1,1,4,4,4-hexafluoro-2-chloro-butene-2, 1,1,1,4,4,4-hexafluoro-2-bromo-butene-2, or a mixture thereof which comprises adding thereto a solution of an alkali metal hydroxide or alkali metal lower alcoholate in a lower alkanol, diluting the resulting mixture with water to form an aqueous phase and an organic phase, and separating pure 2,2,2-trifluoro-1-chloro-1-bromo-ethane from the organic phase by distillation.

2. The process defined in claim 1 wherein the molar proportion of alkali metal hydroxide or alkali metal lower alcoholate to butene is at least 2:1.

3. The process defined in claim 1 wherein the organic phase is separated, washed with water, dried and subjected to distillation to isolate the purified 2,2,2-trifluoro-1-chloro-1-bromo-ethane in the distillate.

4. The process defined in claim 1 wherein the alkali metal hydroxide is sodium hydroxide.

5. The process defined in claim 1 wherein the alkali metal hydroxide is potassium hydroxide.

6. The process defined in claim 1 wherein the alcoholate is potassium methylate.

7. The process defined in claim 1 wherein the alcoholate is sodium butylate.

8. The process defined in claim 1 wherein the addition is carried out at a temperature below the boiling point of 2,2,2-trifluoro-1-chloro-1-bromo-ethane.

9. The process defined in claim 1 wherein the addition is carried out at a temperature between about 0 and 25° C.

References Cited by the Examiner
UNITED STATES PATENTS 1,825,814  10/1931  Norris _____ 260—652

DANIEL D. HORWITZ, *Acting Primary Examiner.*